United States Patent [19]
Kurtz

[11] Patent Number: 6,023,367
[45] Date of Patent: *Feb. 8, 2000

[54] ILLUMINATION SYSTEM FOR A FILM SCANNER

[75] Inventor: Andrew F. Kurtz, Rochester, N.Y.

[73] Assignee: Eastman Kodak Company, Rochester, N.Y.

[*] Notice: This patent is subject to a terminal disclaimer.

[21] Appl. No.: 08/865,759

[22] Filed: May 30, 1997

Related U.S. Application Data

[62] Division of application No. 08/409,570, Mar. 24, 1995, Pat. No. 5,671,084.

[51] Int. Cl.[7] ............................. G02B 21/36; G02B 23/00
[52] U.S. Cl. ..................... 359/362; 359/365; 359/366; 359/367; 359/599; 359/69
[58] Field of Search .................... 359/362, 365, 359/366, 363, 367, 599, 69

[56] References Cited

U.S. PATENT DOCUMENTS

| | | | |
|---|---|---|---|
| 3,988,537 | 10/1976 | Cooley | 178/7.6 |
| 4,797,711 | 1/1989 | Sasada et al. | 355/32 |
| 4,868,383 | 9/1989 | Kurtz et al. | 250/228 |
| 4,899,040 | 2/1990 | David et al. | 250/216 |
| 5,003,379 | 3/1991 | Moore, Jr. et al. | 358/54 |
| 5,012,346 | 4/1991 | DeJager et al. | 359/214 |
| 5,016,950 | 5/1991 | Smith | 359/15 |
| 5,037,166 | 8/1991 | Malcolm et al. | 359/15 |
| 5,046,793 | 9/1991 | Hockley et al. | 359/12 |
| 5,103,385 | 4/1992 | Federico et al. | 362/298 |
| 5,146,341 | 9/1992 | Erck et al. | 358/214 |
| 5,153,733 | 10/1992 | Fetterman et al. | 358/214 |
| 5,155,596 | 10/1992 | Kurtz et al. | 358/214 |
| 5,191,474 | 3/1993 | Suzuki et al. | 359/668 |
| 5,241,459 | 8/1993 | Kaplan et al. | 362/298 |
| 5,365,354 | 11/1994 | Jannson et al. | 359/15 |
| 5,534,386 | 7/1996 | Petersen et al. | 430/320 |
| 5,627,426 | 5/1997 | Whitman et al. | 359/599 |

FOREIGN PATENT DOCUMENTS

WO 95/03935  2/1995  WIPO ............................ B29D 111/00

OTHER PUBLICATIONS

"Optical Scanning Systems for a CCD Telecine for HDTV", by Kurtz et al in SPIE, vol. 1448; Camera and Input Scanner Systems, 1991, pp. 191–205.

"Kinoform Diffusers", by J. J. Caulfield, SPIE Proceedings, vol. 25, Developments In Holography, 1971, pp. 111–113.

*Primary Examiner*—Cassandra Spyrou
*Assistant Examiner*—Mohammad Y. Sikder
*Attorney, Agent, or Firm*—Nelson Adrian Blish; David A. Novais

[57] ABSTRACT

An illuminator system for a film scanner of the type having a linear image sensor, a film gate through which an area of film to be scanned can be positioned, and an aperture at the film gate for defining the area of film to be scanned. The illuminator system includes a light source which produces a light beam; an optical condenser between the lamp and the film gate to condense and shape the beam; and optics adapted to diffuse and direct the light beam so as to produce a uniform line of controlled diffuse illumination at the film gate. A spherical relay lens between the lamp and the optical condenser has a focal length nominally equal to a distance between the relay lens and the optical condenser to constrain the beam within the entrance pupil of the optical condenser. A spectral filter is between the lamp and the film gated to remove unwanted wavelengths of radiation from the light beam. The optical condenser comprises a spherical condensing lens adapted to alter the light beam so as to be slowly converging and to focus the beam down into a line of light. The optics comprises an integrating diffuser to transform the light so that the line of light at the film gate will have a substantially uniform intensity profile.

34 Claims, 12 Drawing Sheets

ILLUMINATION SYSTEM FOR A FILM SCANNER

This is a Divisional of application Ser. No. 08/409,570, filed Mar. 24, 1995 now U.S. Pat. No. 5,671,084.

BACKGROUND OF THE INVENTION

1. Technical Field

The present invention relates to an illuminator for a film scanner and, more particularly, to a linear light source illuminator for use in a film scanner employing a linear image sensor, which is particularly suitable for scanning standard 35 mm motion picture film.

2. Background Art

State of the art illumination systems for telecine film scanners typically include light-sensitive charge-coupled device (CCD) linear arrays, which provide a serial output representing a line of a television raster, and a light source for illuminating a linear section of the film being scanned with either a scanning light beam or a line of diffuse light. For color television applications, the film scanner can include a light source that is subjected to dichroic filtration to tailor the spectral content of the light according to the film to be scanned. A light integrator transforms a light beam from a light source into a line of diffuse light emitted through an elongated aperture for illumination of the film frame. The line of light must be sufficiently uniform in intensity and diffusion along its length, and must have the red, green and blue spectral radiances for the film being scanned. As light passes through the illuminated linear section, it is color- and intensity-modulated by the image therein, and is imaged onto 3-color filtered CCD arrays as described, for example, in commonly assigned U.S. Pat. No. 5,012,346 to DeJager et al and U.S. Pat. No. 5,003,379 to Moore, Jr. et al.

The film motion provides the vertical (frame) scan, and the linear synchronized electronic cycling of the CCD array provides the horizontal (line) scan of a rasterized television signal with both chrominance and luminance components. A number of the considerations taken into account in scanning positive (print) and negative color film stocks with such telecine film scanners is set forth in the article "Optical Scanning Systems for a CCD Telecine for HDTV", by Kurtz et al in *SPIE,* Vol. 1448, Camera and Input Scanner Systems, 1991, pp. 191–205. As described in that article and in commonly assigned U.S. Pat. No. 4,868,383 and U.S. Pat. No. 5,155,596 to Kurtz et al, and U.S. Pat. No. 5,012,346 to DeJager et al, such film scanner linear light sources have difficulty transforming light emitted by a source lamp into a line of diffuse light of sufficient, uniform intensity for the full lamp life in operating intensity ranges required and which does not vary from moment to moment due to lamp "noise". In the '383 patent and the '346 patent, a linear light integrator is provided with a light-intensity sensor and feedback circuit for regulating the lamp power supply to dampen light output intensity fluctuations of a Xenon arc lamp. Intensity fluctuations from the targeted lamp intensity may be both temporal and spatial, as arc length and position within the lamp envelope varies and shadows caused thereby change from moment to moment. The severity of the fluctuations increases as lamp current is decreased, so that the Xenon arc lamp is preferably driven at a relatively high current and intensity. An integrating cylinder is designed to integrate the light beam from the lamp so that a line of light is emitted as uniform intensity along the length of the aperture at any given moment, regardless of spatial fluctuations and light beam intensity irregularities. Consequently, the intensity of the uniform line of light varies temporally. The temporal variation in the integrated light intensity from the target or reference intensity is referred to as illumination "noise" that is considered in measuring the illumination signal-to-noise ratio performance of the system. This noise level is reduced to acceptable levels by means of the feedback loop.

In recent designs for illumination systems for film scanners, such as for transferring motion picture film into video, much use has been made of light integrating means for providing uniform and diffuse illumination. The uniform illumination of the film assists the image transfer process by reducing the extent of the electronic pattern correction, and preserving the signal to noise ratio. Effectively, all parts of the object are illuminated identically, regardless of position. These film scanner designs are typically non-coherent systems, in which the acceptance angle of the imaging lens is appreciably smaller than the diffuse spread of illuminating light. This diffuse illumination provides so called "scratch suppression", which prevents phase artifacts, such as scratches, from being seen in the transferred image. It compensates for the light which is lost due to refraction and scattering at a scratch by providing higher angle incident light, which is then deflected off the scratch and into the acceptance angle of the imaging lens.

Much of the recent art for the design of film scanner illumination systems has used integrating cylinders to provide diffuse and uniform illumination. In such systems, the homogenizing of the light is largely a function of there being multiple scattering reflections of the light within a cavity before it exits and illuminates the film. As compared to an idealized "single pass" design, in which the integration is accomplished with relatively few surfaces, an integrating cylinder design is inefficient. Furthermore, the integrating cylinders intrinsically provide Lamberthian diffuse illumination, wherein the light is diffused out over a full 180° hemisphere. However, even for scratch suppression, light diffused out beyond approximately 50° is essentially wasted; as the light beyond approximately 50° provides only a marginal gain in the quality of the scratch suppression for the light lost. Furthermore, such light can contribute to increased flare in the image portion of the film scanner. Thus, it would be desirable to have a "single pass" integrator for a film scanner that provided increased efficiency, both by reducing the number of surface interactions and by limiting the angular extent of the diffused light to less than 90°.

This increased light efficiency could then be applied in many ways that could be beneficial to the design of a film scanner, such as: allowing for the use of a lower power lamp and power supply; allowing for the use of lower cost optical elements, including the imaging lens; and/or allowing for a faster rate of image transfer.

In the past, some so called "single pass" systems have been designed using optical diffusers, such as ground glass, opal glass, ceramics, etc., to provide the means for integrating the non-uniform light source into appropriately uniform spatial and angular distributions of illumination. However, like the integrating cylinder, such diffusers often scatter light in a nearly Lamberthian manner, with little control of the angular extent of the diffusion. As a result, such classical diffusers can be highly inefficient in an optical scanner.

DISCLOSURE OF THE INVENTION

It is an object of the present invention to provide an improved illumination system for a film scanner.

In accordance with the present invention, an illumination system is provided for a film scanner in which a film is scanned as it is advanced through a film gate in the scanner. The illumination system includes a lamp which produces a light beam which is adapted to be appropriate for scanning film by spectral filtration to remove unwanted IR and UV radiation, leaving just visible light. Further spectral filtering can then be done, to further refine the spectra to be appropriate for scanning either print and negative films. Other devices such as shutters, filter wheels, and/or light modulators may also be included in the optical path. The beam is then condensed and shaped to provide a uniform line of controlled diffuse illumination at the film gate, where the illumination is further apertured, so as to define the area to be scanned and so as not to illuminate the film perforations. Light transmitted through the film passes through an imaging lens, which directs the light onto a CCD sensor. The sensor may be a tri-linear array, which includes further spectral filtering to define distinct RGB color channels, which then allow the color records of the film image dyes to be scanned separately.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIGS. 5a and 5b are a perspective view illustrating the geometry of the beam-shaping portion of the illumination system, with FIG. 5b merely being a continuation of the drawing of FIG. 5a;

BEST MODE FOR CARRYING OUT THE INVENTION

Figure 1:
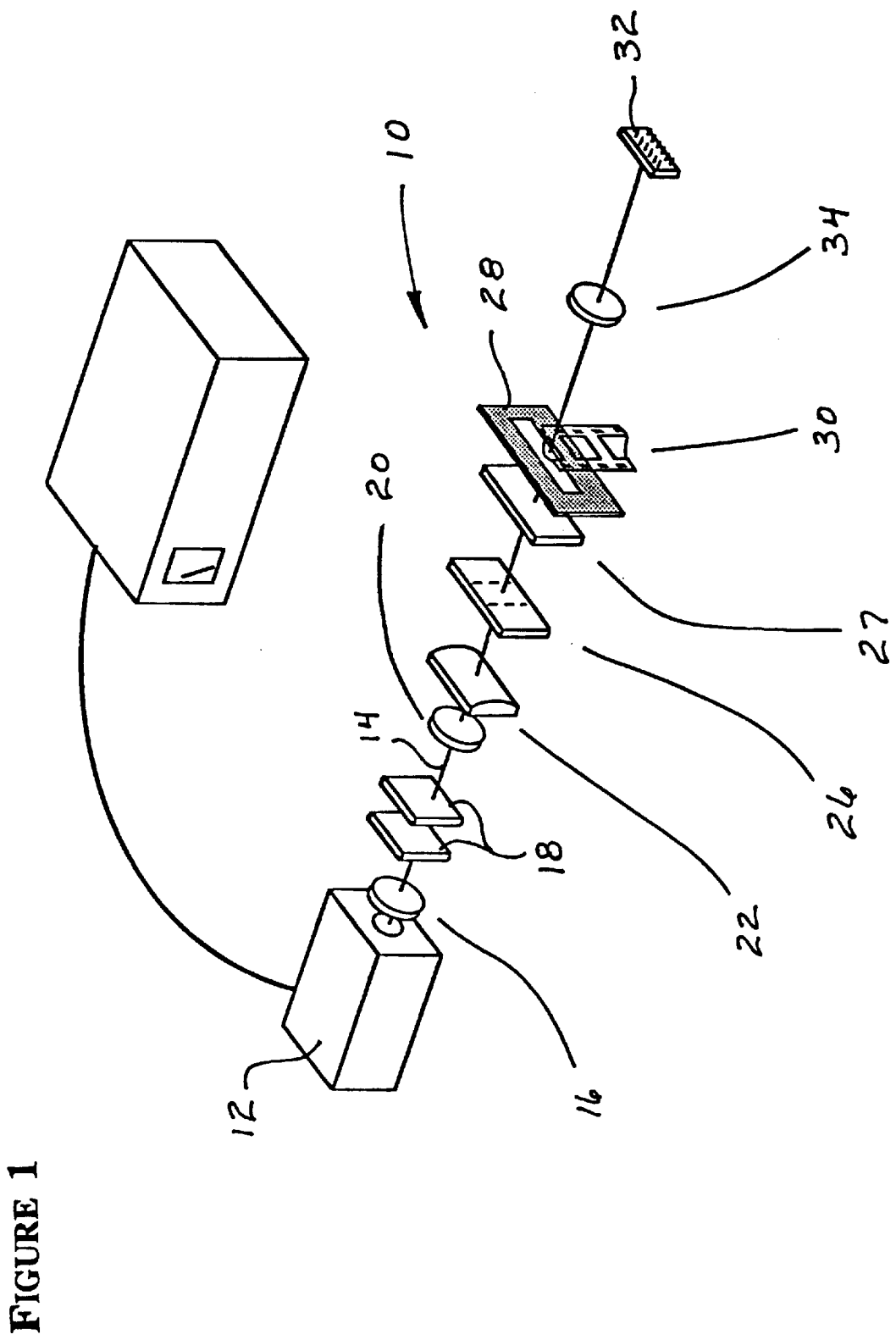
FIG. 1 is a perspective view of a film scanner illumination system using light-shaping diffusers in accordance with the preferred embodiment of the present invention.

The present description will be directed in particular to elements forming part of, or cooperating more directly with, apparatus in accordance with the present invention. It is to be understood that elements not specifically shown or described may take various forms well known to those skilled in the art.

The preferred embodiment of the present invention is shown in the context of a full illumination and imaging system. The optical system shown generally at 10 includes a light source 12, such as a compact short arc xenon lamp from ILC Technology of Sunnyvale Calif. A light beam 14 from the light source is controlled by a relay lens 16 and directed through a series of fixed spectral filters 18 and other components such as a filter wheel and shutter (not shown). A spherical condensing lens 20 preferably alters light beam 14 so as to be slowly converging. A cylindrical condensing lens 22 then focuses the beam down into a line of light 24. An integrating diffuser 26 is placed between cylindrical condensing lens 22 and the beam focus to transform the light so the line of light at the beam focus will be substantially uniform. An illuminating diffuser 27 is placed near the beam focus to redirect the angular distribution of the light, so that the light is spread out in a controlled fashion. The light diverges forward through a limiting rectangular aperture 28, which schematically represents a film gate, which defines the scan area that provides the illumination of film 30. The illuminated area on the film now defines an object which, in turn, is imaged onto a CCD sensor 32 by an imaging lens 34.

A new class of holographic light shaping optical diffuser technologies has recently been introduced by two companies: Physical Optics Corporation of Torrance, Calif. and Lasiris Inc. of Saint Laurent, Quebec, Canada. These diffusers appear to be much more efficient (they are highly transmissive, and have low back scattering) than traditional opal glass diffusers, and they provide a more controlled performance when compared to the traditional ground or opal glass diffuser. By design, these diffusers can diffuse the light over a limited angular extent, and provide elliptical, as well as, circular diffusion. Further, the angular directionality of the diffused light can be controlled. Such holographic light shaping optical diffusers appear to be particularly desirable in practicing the present invention. The integrating diffuser 26 and illuminating diffuser 27 are preferably holographic diffusers.

Figure 2:
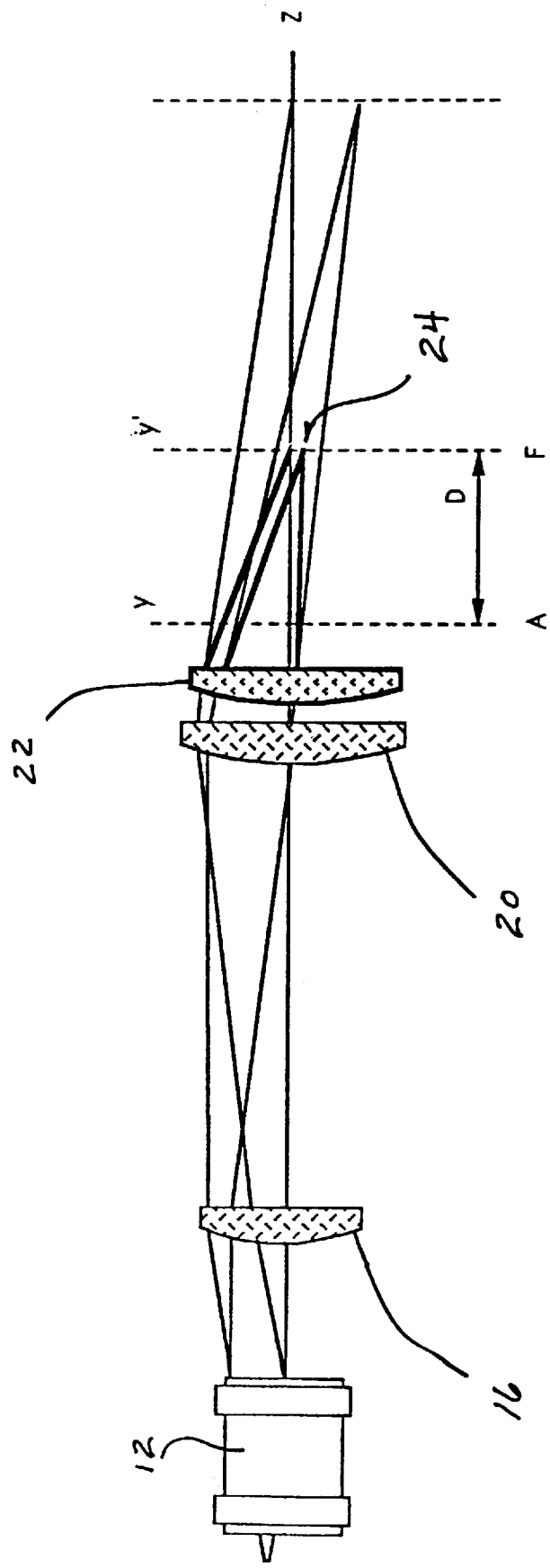
FIG. 2 is a raytrace of the optical path for the condensing optics in the lens system of the present invention.

As shown in FIG. 2, relay lens 16 is spherical with a focal length nominally equal to the distance between relay 16 lens and spherical condensing lens 20. The relay lens constrains the beam within the entrance pupil of the spherical condensing lens and provides the room for such devices as a filter wheel and/or shutter mechanism.

The beam emitted by light source 12 naturally has a Gaussian irradiance profile (power/per unit area). The beam generally retains this characteristic profile both in the beam path between relay lens 16 and spherical condensing lens 20 and in the beam path beyond the spherical condensing lens (for a short distance). The spherical condensing lens forms an image of light source 12 at some distant point. The innate non-uniformities of the light source, which include shadows (dark cast areas around the cathode and cathode support structure), will be evident at this distant image. This means that the beam profile gradually transforms from being approximately Gaussian at the spherical lens, to having dark areas near the center as the distant image is approached. These dark areas are basically images of the cathode and cathode support structure within the lamp.

Figure 3:
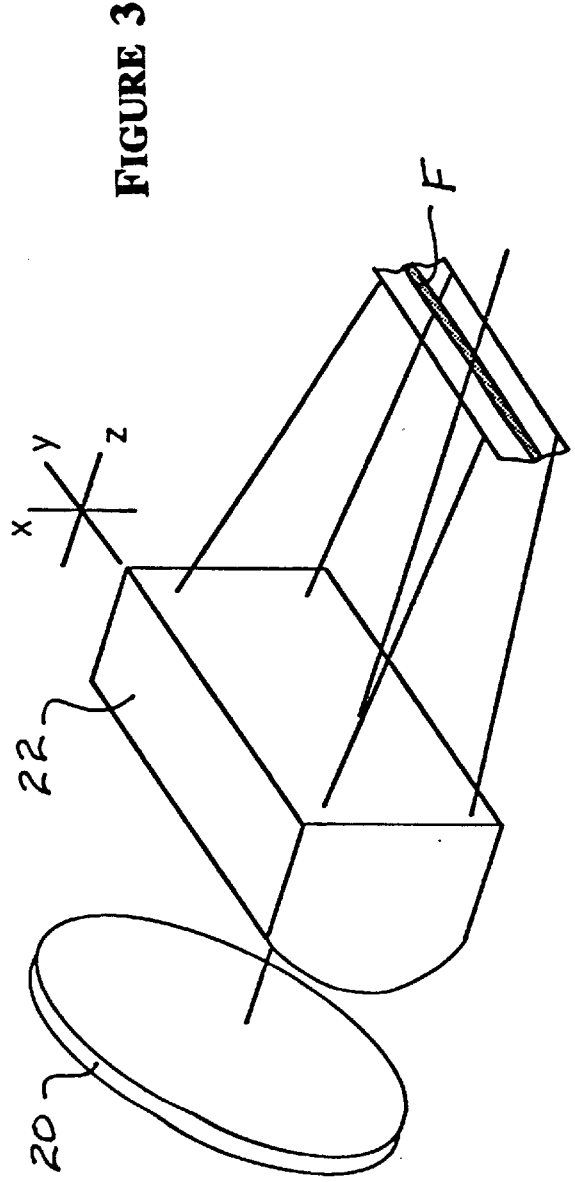
FIG. 3 is a perspective view of the anamorphic focus created by the spherical condensing lens and the cylindrical condensing lens.
Figure 4D:
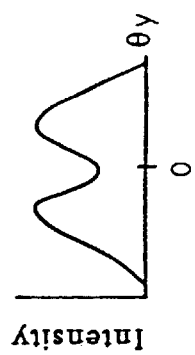
FIGS. 4a–4d graphically illustrate the spatial irradiance and angular intensity profiles at the anamorphic focus; (point F)
Figure 4C:
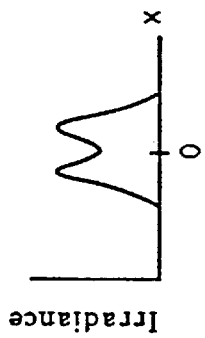

Positive cylindrical condensing lens 22 intercepts the beam a short distance beyond spherical condensing lens 20 and brings the beam anamorphically to a focus in the $\theta_y$ direction, creating a long narrow spot, or line of light, as shown in FIGS. 2 and 3. The effect of this lens is to advance the imaging of light source 12 to an earlier place in the optical path and to create an elongated dark area in the center of the spot. Thus, the irradiance profile I(x') has a dip in the center, as shown in FIG. 4c. There will also be a dark area in the center of the angular intensity profile I($\theta_y$), as is shown in FIG. 4d.

Figure 4B:
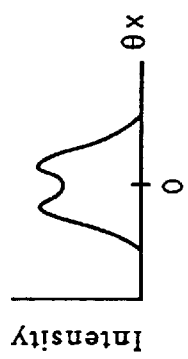
Figure 4A:
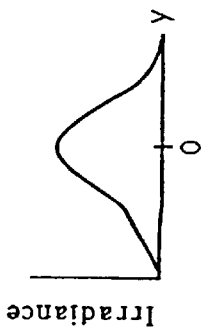

The beam characteristics in the $\theta_x$ direction are largely determined by spherical condensing lens 20. The size of the beam projected by this lens, as seen at the location of the focus cast by the cylindrical condensing lens 22 (point F), will be substantially broader along the y' axis than along the x' axis. This is shown by comparison of the I(y') and I(x') irradiance profiles of FIGS. 4a and 4c, respectively. FIG. 4a also shows that the I(y') profile of the beam at point F will be approximately Gaussian and nominally unaffected by shadowing effects. Lacking the additional power of the cylindrical lens, the intensity profile I($\theta_x$) will be spread over a narrower angular range, or be more specular, than the I($\theta_y$) profile as is shown in FIGS. 4b and 4d. This I($\theta_x$) angular profile will also have a dip in its center.

Figure 5A:
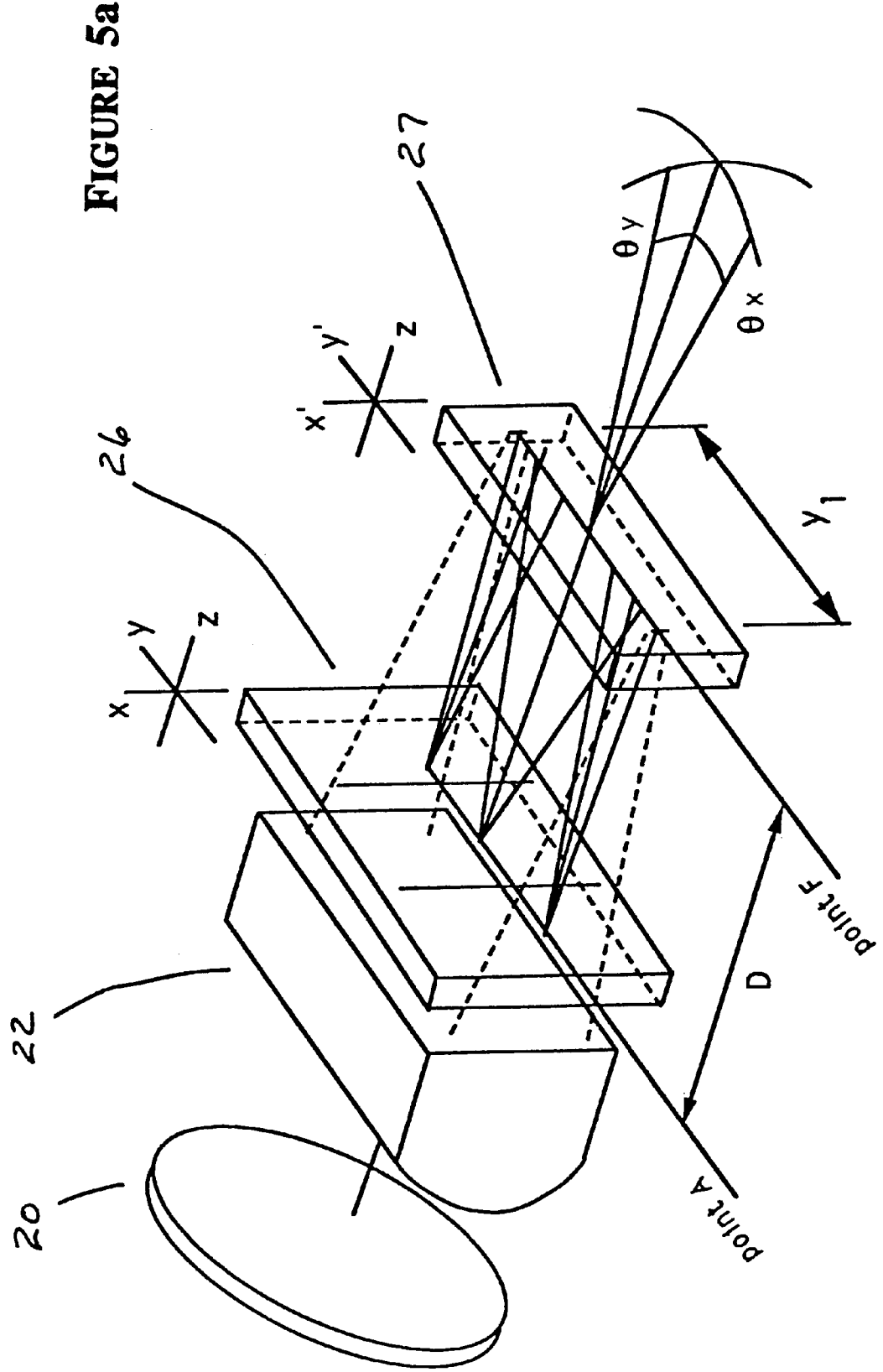

Due to these non-uniformities in the angular and spatial beam profiles, the light at spot F is not appropriate for illuminating the film directly. These non-uniformity problems, which are largely light source dependent, will be remedied by integrating diffuser 26, which is placed at a point A between the cylindrical condensing lens and the beam focus (point F), which are a distance D apart (FIG. 5a). This integrating diffuser 26 will have incident upon it an irradiance distribution I(y), which will be very much like the I(y') distribution of FIG. 4, except that it will be even broader and more Gaussian. At point A, the integrating diffuser will be seeing incident illumination I(y), that is typical to a Koehler illumination design. That is, the integrating diffuser will be like the "object" in a Koehler system that receives light from each point on the source, such that the source structure is smoothed out. The spherical lens is acting much like Koehler-style condensing lens 20.

Figure 5B:
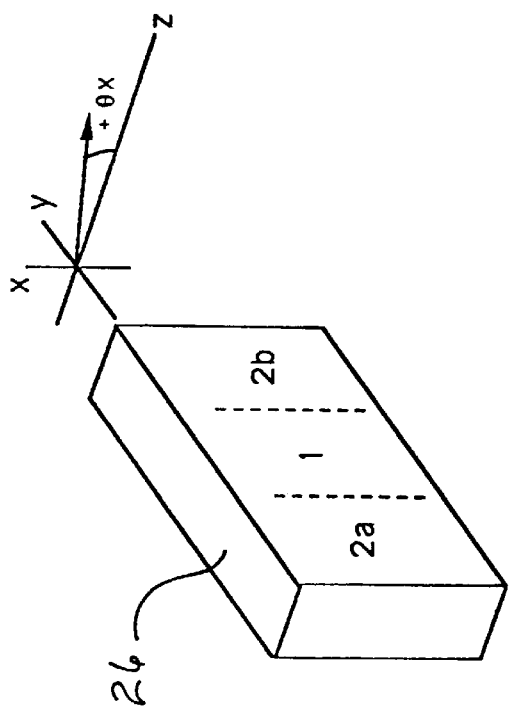
Figure 7A:
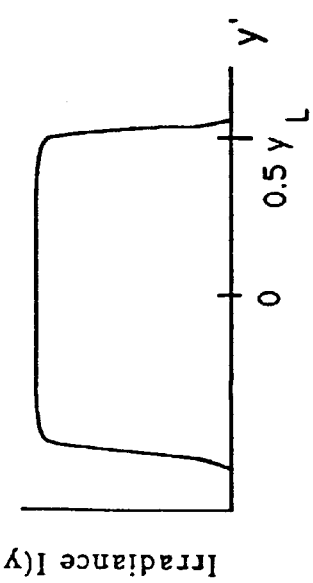
FIGS. 7a and 7b are two plots illustrating the intended spatial profiles at the illuminating diffuser and film gate, respectively.
Figure 7B:
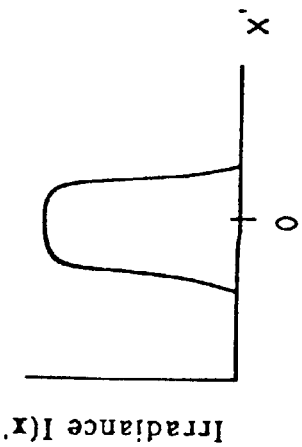

The primary purpose of integrating diffuser 26 (shown in more detail in FIG. 5b) is to transform the non-uniform irradiance profiles I(x) and I(y) at point A into a substantially uniform irradiance within a predefined linear area at point F. These idealized uniform irradiance profiles I(y') and I(x') intended for point F are illustrated in FIGS. 7a and 7b, respectively. To accomplish this, the integrating diffuser will be partitioned with different diffusing properties in different areas. The integrating diffuser 26 of FIGS. 5a and 5b shows the diffuser being split into three such areas. It is to be understood that there can be more than three regions, limited by practical design and manufacturing considerations.

Figure 6D:
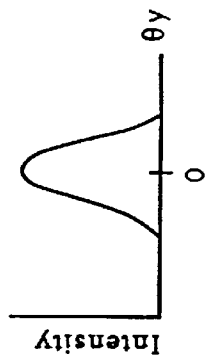
FIGS. 6a–6d are plots of the diffusing angular profiles of the integrating diffuser.
Figure 6C:
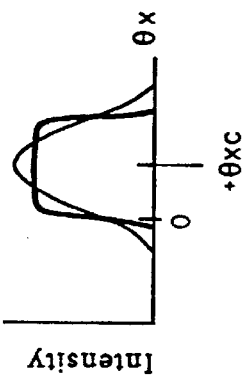
Figure 6B:
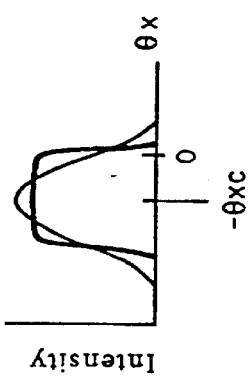
Figure 6A:
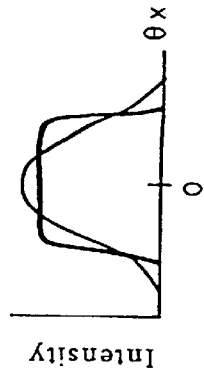

As shown by the Region 1 plot in FIG. 6a, the light in the center area of the diffuser is spread out symmetrically as a function of $\theta_x$. Comparatively, the light in Region 2a in FIG. 6b is diffused in a directional manner, with most of the light biased in the −$\theta_x$ direction. The light re-directed by the diffuser in Region 2b of FIG. 6c is the inverted version of Region 2a, as it is biased in the +$\theta_x$ direction. Light from the central region (Region 1) is redistributed so that at the desired location (point F), it is spread over most of the prescribed linear area. The light from Region 1 will, of itself, be non-uniform, with its peak at the center or along the optical axis. Light from the off axis Region 2a is diffused non-uniformly across a portion of the desired linear illumination area, with its peak irradiance offset from the optical axis. Light from Region 2b is diffused in a manner nominally identical to that of Region 2a, except that the manner of the diffusion is inverted about the optical axis. The intended cumulative effect of combining the light from the three regions in this manner, is that the light is spatially structured to create a substantially uniform spatial intensity profile I(x',y') within a prescribed area.

The integrating diffuser also contributes to tailoring the angular profile of the light in the $\theta_y$ direction. The $\theta_y$ angular width of the beam in the region between the cylindrical lens and the illuminating diffuser is largely determined by the cylindrical lens, which essentially focuses the light through the integrating diffuser. The I($\theta_y$) angular profile is also effected by the shadowing in the beam (as described earlier) and by the residual optical aberrations introduced by the condensing optics. As shown in FIG. 6d, the I($\theta_y$) diffusion profile of the integrating diffuser is much narrower than the I($\theta_x$) profiles, effectively making the integrating diffuser an elliptical diffuser. In the $\theta_y$ direction, the integrating diffuser contributes enough diffusion to help smooth out the dips in the I($\theta_y$) profile of FIG. 4d, while introducing minimal growth in the I(x') beam width at point F.

Figure 8A:
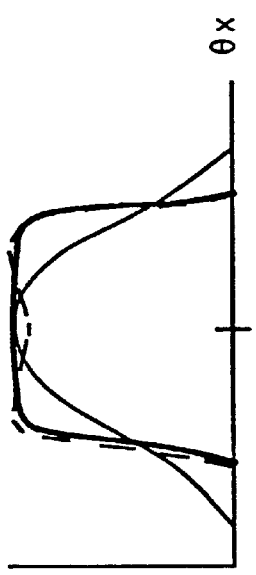
FIGS. 8a and 8b are plots illustrating the light-diffusing angular profiles of the illuminating diffuser.
Figure 8B:
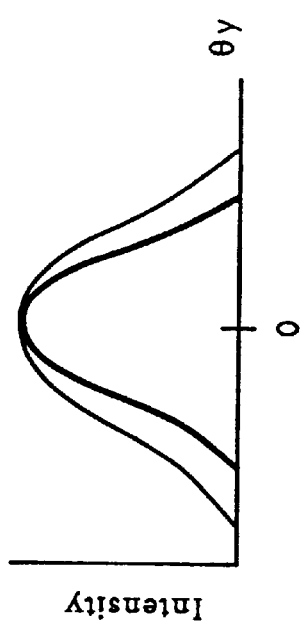

As shown in FIGS. 1 and 2, illuminating diffuser 27 is placed at (or near) the beam focus cast (point F) by cylindrical lens 22, where it sees an anamorphic image of the lamp. Thus, spherical condensing lens 20 and cylindrical condensing lens 22 act anamorphically together as an Abbe style condenser, in which the source is imaged onto the "object" (illuminating diffuser 27). The incident illumination profiles I(x) and I($\theta_y$) at point F are largely determined by the light source and these two lenses, with some overlaid diffusion introduced by the integrating diffuser. The illuminating diffuser modifies the angular profiles of the incident uniform light, thus spreading the light out to approximately ±50° in both $\theta_x$ and $\theta_y$, and thereby providing the illumination appropriate for scratch suppression. The illuminating diffuser actually works in cooperation with the integrating diffuser and the cylindrical lens to achieve this desired diffusion. This diffuser could be a standard 35° spreading circular diffuser manufactured by Physical Optics. In FIGS. 8a and 8b, angular profiles for I($\theta_x$) and I($\theta_y$) are provided of the light illuminating the film, as produced by the combination of the lamp, lenses and diffusers. The solid line profiles, which fall off gradually towards minimal intensity at approximately 50°, will provide significant scratch suppression and high angular efficiency.

Aperture plate 28 (FIG. 1) follows illuminating diffuser 27 and defines a linear area of film illumination. This linear area will typically be somewhat larger than the actual area to be scanned. Other areas of the film, including parts of the image and the perforations, are blocked so as to minimize flare light in the imaging system. This aperture plate may be designed such that the film is in direct contact with it as it traverses the film gate. For example, the aperture plate may be curved, may have film guiding members, and may have conditioned surfaces. The film itself may be held a short distance apart from the illuminating diffuser, so as to minimize the possibilities of damage to either item. This distance should be small enough that, within the scan area, the average brightness (radiance) of the film is not reduced as it is compared to the average radiance within the scan aperture at the illuminating diffuser. This distance should also be large enough that the surface structure of the illuminating diffuser is far enough away from the film, so as to not be in focus when the film is imaged to the CCD sensors.

These concepts may be applied to the design of an illumination system for a film scanner for transferring motion picture images into video. The design might for example be directed towards providing illumination appropriate for scanning Academy 35 mm format film, with an intended scan width $Y_L$=20 mm. The uniformity of the irradiance at the film gate would best have less than 10% variation of the light level across the defined scan line. The film gate illumination may be diffused out to approximately 50° with relatively little light at higher angles. The integrating diffuser may be partitioned into only three regions.

The illumination system including integrating diffuser 26, can be designed using functional representations of both the incident light and the diffusion in the various regions. These functions, which can be continuous or numerical in form, can be drawn from idealized or measured data for the incident light and the diffusion. The resultant irradiance I(y') input to illuminating diffuser 27 can be modeled by convolving the input intensity function I(y) at point A for a given region with the appropriate diffusing function $D(\theta_x)$, and then summing together the independent results of all the regions. There are several variables that can be adjusted to attain a satisfactory answer; including the profile of the input irradiance I(y), the width of the central region R1, the angular extent and profile of the diffusion in the central region, the angular extent and profiles for the diffusion in the off axis regions, and the amount of angular bias applied in the off axis regions. This process can be repeated iteratively, until an optimized result is obtained.

The system modeling can be made more complete by including effects such as the $\cos^4\theta$ fall off, the incidence of non-collimated input light on the diffuser, the variation of this non-collimated input incident light with field position, and the response of the diffuser to no-normal incident light. Other modeling methods, such as Monte Carlo raytracing would also be applicable.

Figure 9A:
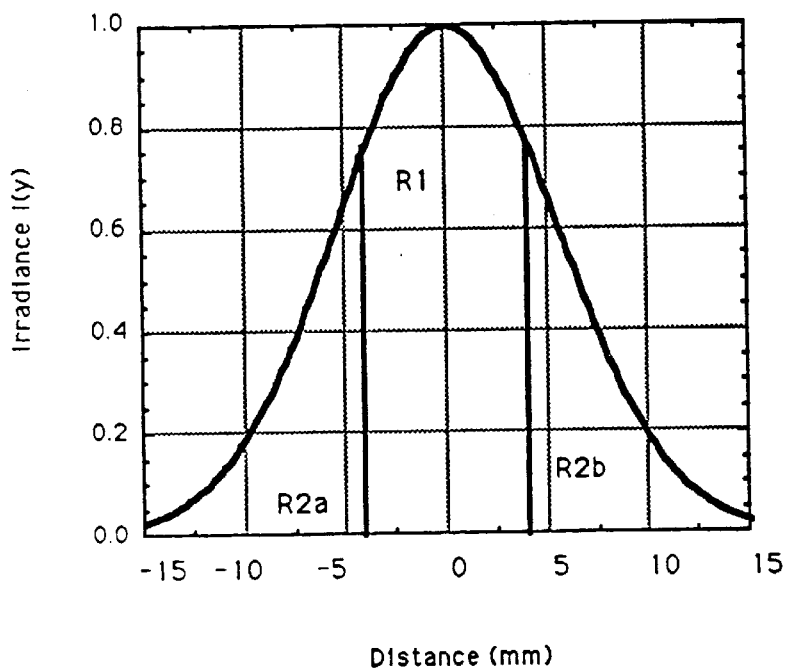
FIG. 9a is a figure illustrating the partitioning of the input intensity function.
Figure 9B:
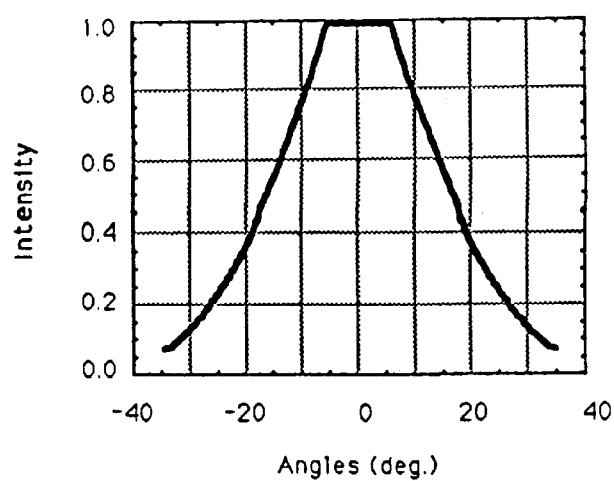
FIG. 9b is the diffusing function for region 1 of the design example.
Figure 10:
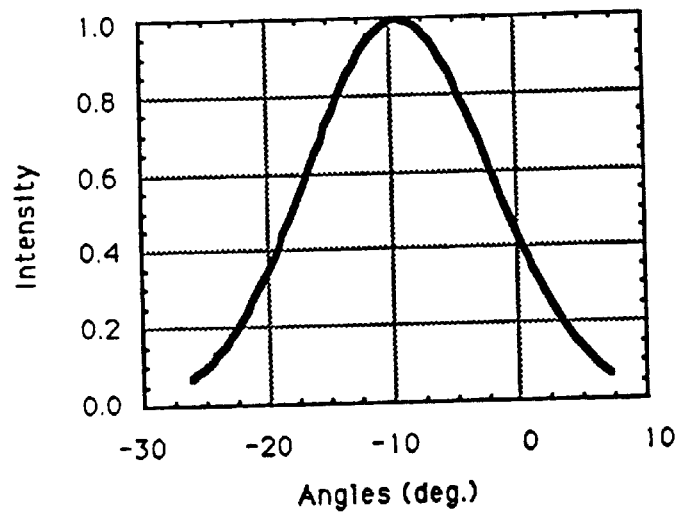
FIG. 10 is the diffusion function for region 2a of the design example.

For example, a design was done in which the incident light I(y) at integrating diffuser 26 was modeled as a Gaussian distribution $$I(y)=e^{-2r^2/a^2}$$

where a=11 mm, for a total incident beam width of 22+ mm. The central region was then partitioned, so that the central region was 8 mm wide. Illuminating diffuser 27 was positioned at the focus cast by cylindrical lens 22, and a distance D=30 mm from integrating diffuser 26. The diffusion function for the central Region $D_1(\theta_x)$, which is shown in FIG. 9b, is representative of a 30° diffuser from Physical Optics Inc. (Torrance, Calif.) The diffuse response is flat over the central ±6° range, has a half-width-half-maximum of 16.5°, and a $1/e^2$ half-width of 30°. The diffusion function $D_2(\theta_x)$ for the off axis Region 2a, which is shown in FIG. 10, is modeled after a 15° diffuser from Physical Optics. This diffusion function is Gaussian in shape, with a 14.5° $1/e^2$ half-width and an offset angle of $\theta_{xc}$=−9.6°. The modeled diffusion for Region 2b is identical to that for Region 2b, except that the offset is $\theta_{xc}$=+9.6°.

Figure 11:
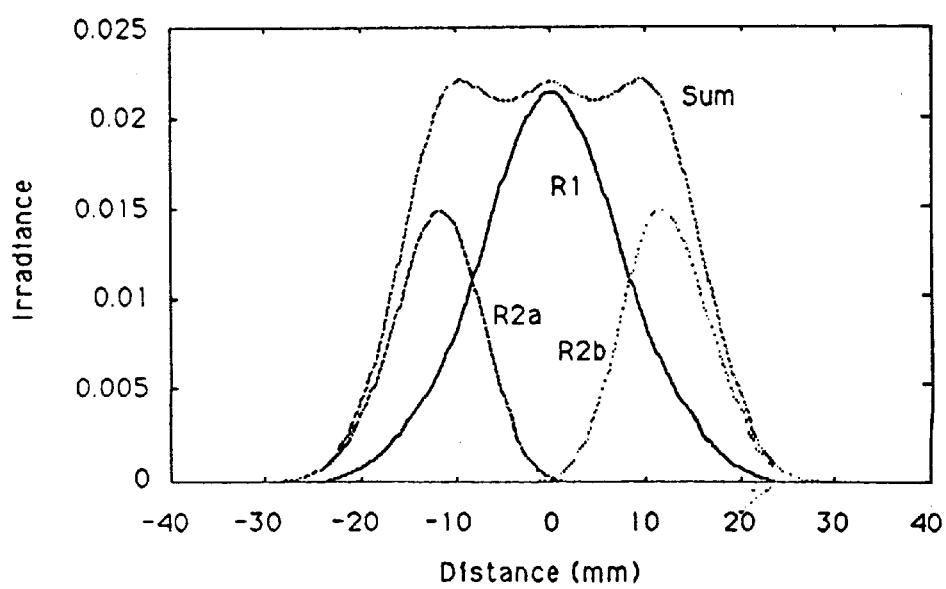
FIG. 11 is a graphical representation of the irradiance profile incident at the illuminating diffuser.

An example of a resultant irradiance I(y') incident to illuminating diffuser 27, as modeled using the functions shown in FIGS. 9b and 10, is shown in FIG. 11. The profile of FIG. 11 indicates an irradiance variation of only 5% over the central 20 mm. This residual non-uniformity can be compensated by electronic pattern correction. The optical efficiency of this example, as defined as the percentage of the irradiance along the y'-axis, contained within the central 20 mm of the I(y') profile, as compared to the input I(y) profile, is some 60%.

Illuminating diffuser 27, in cooperation with the other elements, is designed to provide the desired $\theta_x$ and $\theta_y$ diffusion spreads, which should approach approximately ±50°. In this example, the cylindrical lens brings the beam to a focus in the $\theta_y$ direction with an NA of approximately 0.5. Integrating diffuser 26 is highly elliptical and provides $\theta_y$ diffusion only a few (2 to 3) degrees wide. Illuminating diffuser 27 is mostly simply a circular diffuser, which provides, for example, 30° diffusion (approximately 10% point half angles). However, the illumination incident on the illuminating diffuser does not necessarily have the same angular widths in the $\theta_x$ and $\theta_y$ directions. In this example, the angular width of the incident light will be broader in the $\theta_y$ direction (from the cylindrical lens) than in the $\theta_x$ direction (from the integrating diffuser). The illuminating diffuser can compensate by having an elliptical response, and thus providing a more uniform net angular input to the film and the imaging lens. For example, an illuminating diffuser with 30° $\theta_y$ by 35° $\theta_x$ diffusion could be used for this purpose.

In this example, the defining aperture would be somewhat wider along the Y' axis than the defined scan width of 20 mm, to allow the film and the film gate manufacturing tolerances and to allow for movement of film in the gate. For similar reasons, the aperture would also be wider than the actual scanned area in the X direction as well. For example, the defining aperture might have a length of 21 mm and a width of 3 mm. Also, the aperture plate will separate the film and the illuminating diffuser by a nominal distance of 0.8 mm.

FIGS. 8a and 8b, which illustrate another optimization of the present invention, provides one solution for the $I(\theta_x)$ and $I(\theta_y)$ angular profiles for the film illumination (solid lines). The solid line profiles represent a reasonable balance between scratch suppression and angular efficiency. However, there are angular profiles even more optimum for scratch suppression. Both angular profiles could be more flat topped and less rounded. The $I(\theta_x)$ plot of FIG. 8a shows and example of this in BOLD line. An even more optimum profile for scratch suppression is one that has a central dip, with intensity peaks at higher angles. This is shown in the $I(\theta_x)$ graph (FIG. 8a.) by the dashed ( - - - ) line.

Additionally, as scratches on motion picture film tend to lie in the X direction, rather than the Y direction, in a telecine it may be reasonable to provide a narrower intensity profile $I(\theta_y)$ for than $I(\theta_x)$. For example, the $I(\theta_y)$ profile could be limited to a narrower range of angles (say ±35 degrees), as illustrated by the BOLD curve of FIG. 8b. This would increase the brightness (radiance) of the film illumination, thereby improving system efficiency.

FIG. 7a illustrates another optimized spatial profile which produces an irradiance distribution at the film which is uniform across the scan line. FIG. 11 illustrates an irradiance profile designed with the goal of FIG. 7a in mind. However, sometimes it is desirable to provide and irradiance distribution which is other than uniform. For example, integrating diffuser 26 could be designed to provide a profile with a center dip and peaks at the edges of the scan area, so as to correct for $\cos^4\theta$ fall-off in the imaging system.

Likewise, it would also be possible to design the integrating diffuser to provide uniform (or non-uniform, such as $\cos^4\theta$ corrected) radiance (power unit area per unit angle) profiles at the film, rather than designing for the irradiance (power per unit area) profiles. Ultimately, it is the radiance, not the irradiance, that is important for illuminating the film. The radiance not only includes the power density distribution (the irradiance), but the angular distributions as well.

In the prior discussions, it was assumed that the angular response of the system (particularly for $I(\theta_x)$) was uniform with field. That is, with the position across the scan line. However, the angular input to the illuminating diffuser is not uniform with position. For example the distributions from the off-axis Regions 2a and 2b are narrower than for the central Region 1. The contributions from Regions 2a and 2b are also concentrated near the ends of the scan line. Though, the final radiance is significantly determined by the illuminating diffuser, some non-uniformities in radiance may persist. If these are not negligible, the design of the system could be changed to compensate. For example, the integrating diffuser could peak the irradiance in the appropriate areas; or the integrating diffuser could be partitioned into more areas, in which case the $\theta_x$ angular spreads of diffusion for these areas would tend to narrow and become more alike.

Yet another means for compensating for such radiance variations would be to partition illuminating diffuser 27 (in $\theta_x$) as well. For example, the diffusion of the illuminating diffuser could be increased with field; further off axis along the scan line. This would work because the film would typically be offset from the illuminating diffuser by a small gap.

Another integrating diffuser 26 partitioning option would include partitioning it into more regions (odd number), instead of just three regions. With more regions, the diffusion in these regions would tend to be narrower than those shown earlier in FIGS. 9 and 10. This would allow the irradiance profiles at point F to be better controlled. For example, looking at FIG. 11, the dips could be filled in, to provide a more uniform response. Also, the 'cut-off' at the edge of the scan line could be better controlled (sharper), thus improving system efficiency. Furthermore, with narrower diffusion in these regions, the radiance profiles at the film will vary less with field.

Still another integrating diffuser option would include partitioning it into an even number of regions. A design family seems plausible wherein the input intensity is split down the center, and there are, for example, four regions. The two central regions would have angular offsets in opposite directions; and the two outside regions would likely have smaller offset angles and narrower diffusion profiles, as compared to the three region example of FIG. 10.

The partitioning of a diffuser into an increasing number of regions creates a structure which bears increasing resemblance to an array of refractive or diffractive lenslets. This analogy is particularly relevant because of the ability of Physical Optics to produce a bias, or offset angle.

Another integrating diffuser angular diffusing option includes using opposite bias angle diffusion. In the earlier discussions, particularly in FIGS. 5, 6, and 10, the diffusion in the off-axis regions was angularly biased or offset to direct the light away from the optical axis. Alternately, these offsets could be reversed so that the light from Regions 2a and 2b crosses the optical axis, and Region 2a fills in the +y' side and region 2b fill in the −y' side.

Still another integrating diffuser angular diffusing option includes using other diffusion profiles. For example, in comparison to FIGS. 6, 9, and 10, the discussion and design example are based on diffusers, such as those from Physical Optics, which have diffusion profiles that gradually taper off, perhaps in a Gaussian like manner. If available, diffusers with flatter tops and steeper sides would be preferable. Primarily, such distributions would enable the integrating diffuser to provide I(y') profiles at point F that have steeper drop offs at the ends of the scan line; thereby increasing system efficiency. Also, other schemes for the design of integrating diffuser 26 could be done, where the $\theta_x$ diffusion in the various regions has multiple angular lobes of diffusion.

Other lens systems include using other variants of classical Koehler and critical (Abbe) illumination system designs. It is possible to apply either of these classical methods, either in their basic forms, or in extended forms, which allow space for other components, such as a filter wheel. In the extended forms, the traditional imaging lenses would be performing their normal imaging functions, but they would be condenser lenses in the sense that they still help to shape the illumination, rather than imaging the object (film) to the sensors. These systems, whether Koehler or critical, can be configured in a multitude of ways. More important is how they bring the light (in combination with the cylindrical lens) to the integrating diffuser and the illuminating diffuser. In the earlier description, it was described how the system brings an image of the lamp to illuminating diffuser 27 (critical illumination), and a partially homogenized profile to integrating diffuser 26 (Koehler illumination). It is equally possible to design a system that would reverse this. That is, a system that would put an anamorphic image of the lamp at the integrating diffuser (critical illumination) and a homogenized input to the illuminating diffuser (Koehler illumination).

In the $\theta_y$ direction, the integrating and illuminating diffusers would have an easier task because the input light would be more homogenized. But in the critical $\theta_x$ direction, the integrating diffuser would have a much more difficult task, as it would see that image (anamorphic) of the lamp. Whatever structure in the lamp would show up there, and if it varies dramatically with bright and dark spots close together, it could be hard to design an integrating diffuser for it. Furthermore, the system would be sensitive to lamp alignment, variations from lamp to lamp, and lamp variations with time and age.

It is to be understood that this system is described in terms of the principal functions for the various components, and that variations are possible which might alter or improve the performance. For example, the cylindrical lens might consist of one or more elements, as is appropriate for controlling optical aberrations. Also, the anamorphic shaping of the beam might also be started earlier in the system, with a cylindrical lens placed in the vicinity of the relay lens.

Also, other types of lenses could be used, such as aspheres. For example, the principals of this illumination system can be adapted for other lamps and light sources including tungsten halogen lamps, metal halide lamps, and light emitting diodes, along with the appropriate optical lensing systems for these lamps.

An additional light shaping diffuser could be located earlier in the optical system. In the prior discussions, the preferred embodiment for the optical system uses Koehler-like illumination for integrating diffuser 26 and critical (Abbe) illumination for illuminating diffuser 27. In particular this helps to desensitize the system to spatial details of the lamp emissions.

Further desensitizing could be obtained by placing another diffuser upstream in the system, for example, before relay lens 16, or between relay lens 16 and spherical condensing lens 20. Such a diffuser would be relatively weak, so as to provide some "smearing" without causing the beam size to expand much, thereby reducing brightness. In particular, it might be useful if this diffuser worked in the $\theta_y$ direction, and made the critical illumination of the lamp to the illuminating diffuser less distinct. For example, it could be an elliptical diffuser, such as a 1° $\theta_y$ by 0.2° $\theta_x$.

Figure 12:
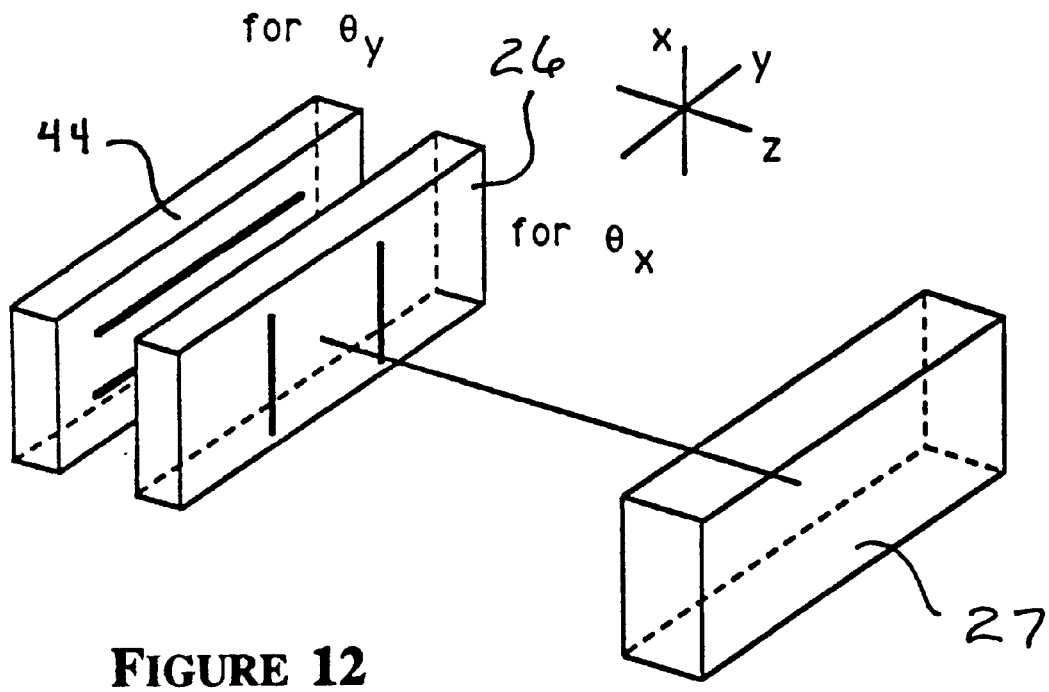
FIG. 12 is a perspective view of an alternate embodiment for the integrating diffuser using two crossed diffusers.

Yet another alternate approach to this same problem of providing the appropriate amount of diffusion in $\theta_y$ would be to use a partitioned $\theta_y$ diffuser in proximity to integrating diffuser 26. This would be a multi-region diffuser 44 like the integrating diffuser, except that the regions would be oriented to mix the light in the $\theta_y$ direction rather in the $\theta_x$ direction (see FIG. 12). This off axis regions would again be biased, much as the profiles of Regions 2a and 2b are for the $\theta_x$ integrating diffuser, except that the angular extents would be much narrower, and they would be biased towards the center (the optical axis), not away from it, which would help to preserve the brightness. This device would act a bit like a diffusing "fresnel" lens.

The performance (response) of light shaping diffusers from Physical Optics appears to vary with the angle of incidence. The deviation from normal performance seems to get worse with increasing incidence angle. Furthermore, the empirical work suggests that the effects can be worse if the diffuser is an elliptical diffuser, and it is hit with light out of the plane of the ellipticity.

For example, the integrating diffuser described earlier is elliptical. That is, it has broad angular diffusion in $\theta_x$, and narrow diffusion in $\theta_y$. If the diffuser is hit with light at some non-zero $\theta_x$ angle, the diffusion will change and the angular width will broaden and the centroid may shift. On the other hand, if the diffuser is hit with non zero $\theta_y$ angle light, the diffusion will broaden, and curve. The effects in $\theta_y$ seem more dramatic than those in $\theta_x$ (for a $\theta_x$ oriented elliptical diffuser). The basic effect of this is to make the diffusion less reliable, probably impacting uniformity and efficiency. As the effects in $\theta_x$ are less dramatic, and as the incident angles in $\theta_x$ are smaller, corrective action probably won't be needed, but corrective action may be more necessary for the $\theta_y$ direction because of the high incident angles and the ellipticity.

Figure 13:
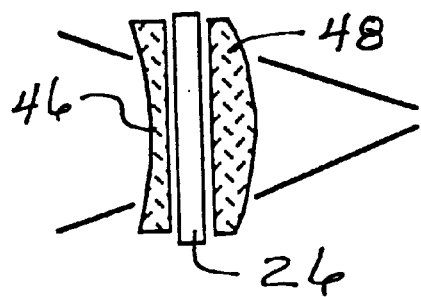
FIG. 13 is an illustration of using field lenses at the integrated diffuser.

In either case, the same corrective measures could be applied: (1) to use diffusers with less sensitivity to incident angles or (2) to put field lenses next to the diffusers. FIG. 13 shows integrating diffuser 26 surrounded by two cylindrical field lenses 46 and 48 that work in $\theta_y$. The first lens would reduce the angular width of the $\theta_y$ hitting the diffuser, and then the second would then restore the macro (NA) of the light as it heads towards the illuminating diffuser. Alternately, integrating diffuser 26 could also be preceded by a $\theta_x$ cylindrical field lens. A $\theta_x$ field lens would not be used after the integrating diffuser.

Alternately integrating diffuser 26 could be preceded by a spherical cylindrical lens, or the illuminating diffuser could be preceded by a field lens (cylindrical or spherical).

Figure 17:
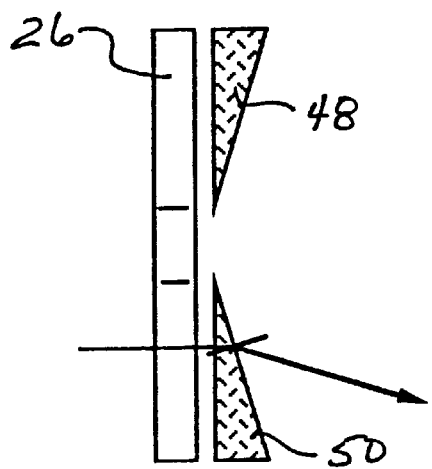
FIG. 17 is an illustration of an alternate means for attaining the bias angle.

The angular bias could be provided by using prisms 48 and 50 after integrating diffuser 26, as shown in FIG. 17. This is not preferable as prisms are dispersive and could cause some color fringing in the illumination; and, of course, they are added components. The prism dispersion could be reduced if achromatic prisms were used.

Xenon arc lamps are dynamic sources and are affected by both pure temporal noise due to the arc wandering on the surfaces of the electrodes and spatial noise due to the gas turbulence rippling through the beam. In general, the beam from a short arc lamp has the lowest noise near the center of the beam, and more noise on the outer rim. It could be useful to have a feedback design option for a film scanner illumination system based on the light shaping diffusers.

There are two ways that this might be accomplished. In the first manner, the feedback system could sample light from the illumination at the film gate, such as through the slit aperture (collecting light with a lens that does not see the film) or through an optical fiber probe. In the second manner, light would be sampled beyond the end of the slit aperture directly with an optical detector or indirectly through an optical fiber probe.

Figure 14:
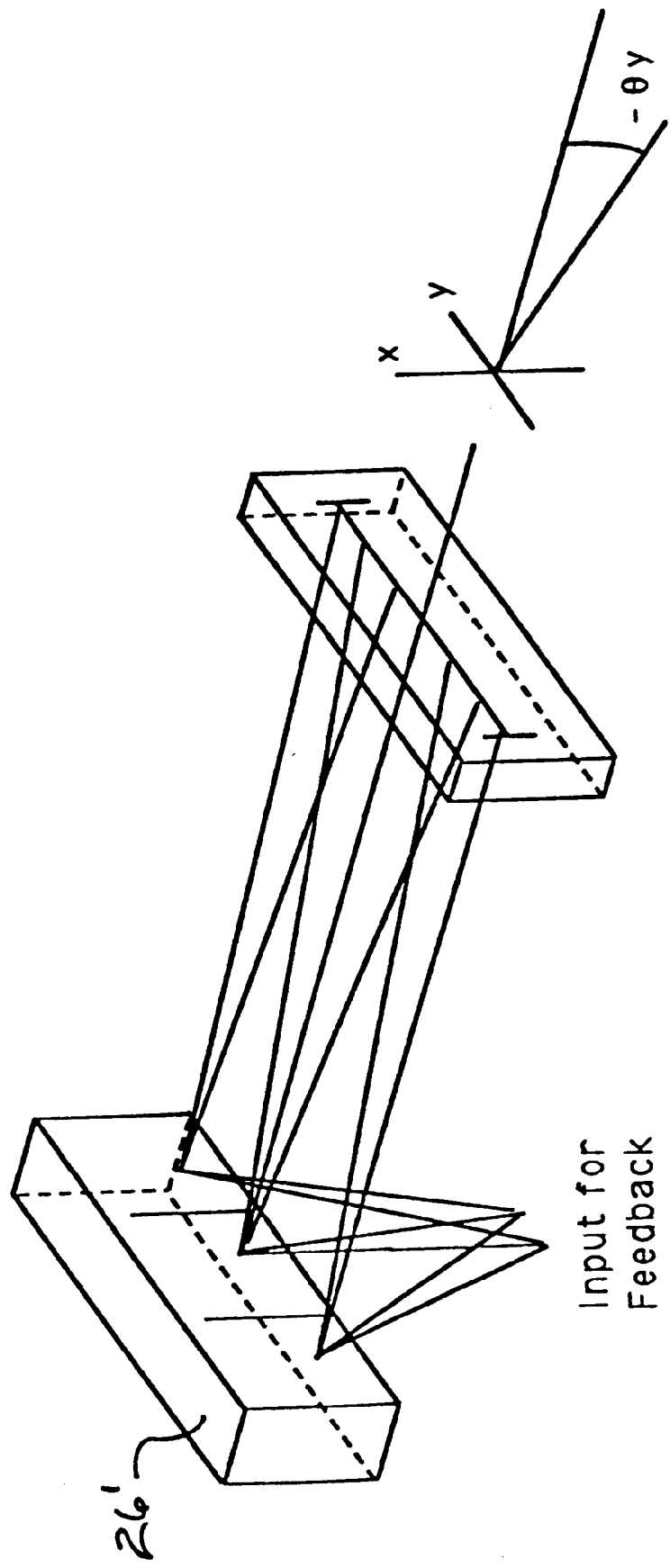
FIG. 14 is a perspective view of an alternate embodiment of the integrating diffuser, altered to provide optical feedback.

An alternative is to alter the design of an integrating diffuser 26 to illuminate a second area, other than the film gate, where light would be provided for feedback. To accomplish this, diffuser 26 would have two lobe profiles, with each region having a secondary angularly narrow lobe directing the light off away from the gate. This concept is illustrated in FIG. 14, where the light is sent off in the $-\theta_y$ direction. The second diffusing lobe for each region would nominally diffuse the light with the same $\theta_y$ angle, but the $\theta_x$ angles would vary with region so that the light from each region overlaps in one place. In this way, the feedback detector would sample integrated light from all parts of the beam, so that the effects of the spatial noise would be averaged out. This light could be sampled directly by the detector, or remotely, for example, through an optical fiber bundle. Alternately, a common $\theta_x$ bias for these second diffusing lobes could be used.

Figure 15:
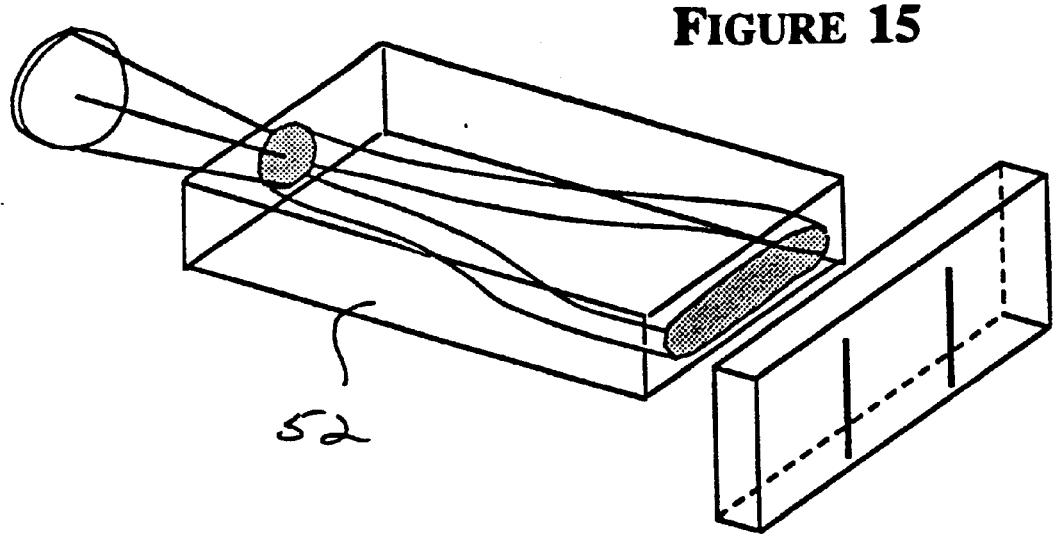
FIG. 15 is a perspective view of yet another embodiment of the circle-to-line transformation, using a fiber optic circle to line converter.

In the preferred embodiment, a cylinder condensing lens transforms the beam from being nominally circular into a long narrow spot. Alternatively, a fiber optic circle-to-line converter 52 could be used, as shown in FIG. 15, which may reduce the burden on the lensing system. The light would be focused onto a circular input face, and then coupled into the bundled fibers. Within the device, the fibers would be randomized, or reorganized in a structured way, such that at the output end, there is a line of light with a much more uniform profile than the input light. Typically, these converters can provide macro-uniformity, but micro-non-uniformity as is shown in the plot accompanying FIG. 12. This micro-non-uniformity can be as much as ±50%. An integrating diffuser could then be used to enhance the uniformity at the film gate and illuminating diffuser.

There are two geometries for this integrating diffuser. In both cases it would be partitioned into many regions. For these examples, the linear extent of the output of the fiber bundle is assumed to be nominally equal to the desired scan width.

In the first example, the diffusion for each region is narrow and has little or no bias. The diffusion from one area mostly just overlaps with the diffused light from its neighbors, and the ensemble creates uniform illumination. The end regions has different diffusion (narrowed, biased) to compensate for the effects of edge roll off.

In the second embodiment, each region diffuses its light across the whole scan line, with biases provided so that light from all the regions substantially overlaps. The diffusion in each region is relatively wide, and the angular biases increases with position away from the optical axis.

Figure 16:
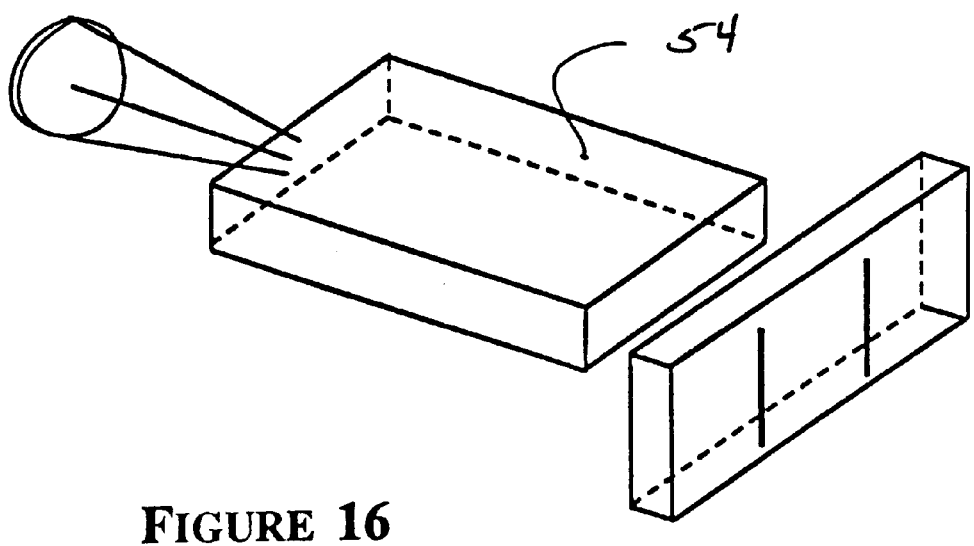
FIG. 16 is a perspective view of yet another embodiment of the circle-to-line transformation, using an integrating bar.

In the preferred embodiment, a cylinder condensing lens is used to transform the beam from being nominally circular into a long narrow spot. Alternatively, an integrating bar/kaleidoscope 54, perhaps rectangular in shape, could be used, as is shown in FIG. 16. In this case, the light is focused into the solid glass bar using a condensing lens (possibly cylindrical). The light is then mixed spatially and angularly as it travels the length of the bar. The light is contained within the bar by total internal reflection. At the output face, the spatial uniformity will have been enhanced, which would ease the burden on the integrating diffuser to mix the light.

In the preferred embodiment, the system is designed to generate a straight linear illuminated area of uniform illumination, for use in combination with a linear CCD sensor array. However, the illuminated area need not be a straight linear area.

Figure 18:
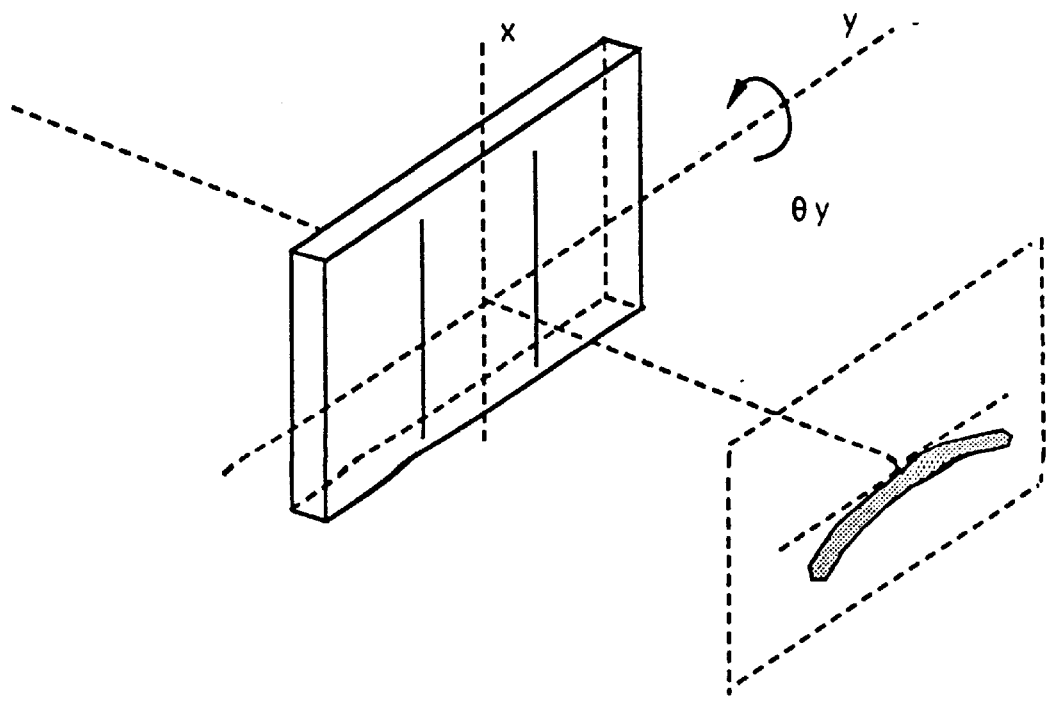
FIG. 18 illustrated an alternative illumination pattern at the film gate.

An arced slit area would be appropriate for some scanners, such as that described in U.S. Pat. No. 5,221,975 (Kessler). An arced slit could most easily be generated by using a fiber optic circle to line converter with a curved line output. Alternately, an arced illumination area could be generated by taking an elliptical diffuser and tilting it in $\theta_y$ (see FIG. 18).

A square area shape (or low aspect ratio rectangular area), as would be appropriate for an area scanner, could be accomplished best by using a spherical lens to condense the light down to the integrating diffuser, with perhaps an integrating bar between the focus and integrating diffuser. With better integration being needed in two dimensions, the crossed diffuser concept of FIG. 12 could be applied.

The invention has been described in detail with particular reference to preferred embodiments thereof, but it will be understood that variations and modifications can be effected within the spirit and scope of the invention.

I claim:

1. An illuminator system for a film scanner of the type having a linear image sensor and film gate means, through which an area of film to be scanned can be positioned, for defining a linear film scan region, said illuminator system comprising:

a light source which produces a light beam oriented on an optical axis;

optical means, located between said light source and the film gate means, for directing and shaping the light beam to intercept the film gate with a linear beam configuration generally corresponding to said linear film scan region; and illumination control means, located between said light source and said film gate means which includes elements with a plurality of discrete regions respectively having different light diffusing properties, which effect different portions of the light beam, thereby cooperatively redistributing the light beam so that the beam illumination at said film gate means has a predetermined radiance profile;

wherein said plurality of regions having different light diffusing properties are located along a first axis which is perpendicular to an optical axis and produce differences in an angular direction and an angular width of light diffused thereby within a plane defined by the optical axis and the first axis; and wherein said illumination control means comprises further regions having the same light diffusing properties, said further regions being located along a second axis that is both perpendicular to the optical axis and perpendicular to the first axis.

2. An illuminator system as set forth in claim 1 wherein said illumination control means include diffuser means having:

(i) a first element with said plurality of discrete regions respectively having different light diffusing properties in different regions along said first axis that is both perpendicular to the optical axis and parallel to linear beam configuration at the film gate, said plurality of discrete regions being adjacent to each other, and (ii) a second element whose light diffusing properties along said second axis that is perpendicular to both the optical axis and the linear beam configuration at the film gate are different from its light diffusing properties along said first axis.

3. An illuminator system as set forth in claim 1 wherein said illumination control means comprise:

(i) an integrating diffuser for transforming the light beam so that the linear beam configuration at the film gate will have a substantially uniform light profile; and (ii) an illuminating diffuser near the film gate for redirecting the light beam's angular distribution so that the light beam at the film gate is spread out in a controlled fashion.

4. An illuminator system as set forth in claim 1 wherein said illumination control means comprises an integrating diffuser with said plurality of discrete regions respectively having different light diffusing properties from each other along said first axis that is both perpendicular to the optical axis and parallel to the linear beam configuration at the film gate, said plurality of discrete regions being adjacent to each other, whereby said illumination control means transforms the light beam to be diffused in a controlled manner to provide a predeterminedly controlled irradiance profile within the film gate.

5. An illuminator system as set forth in claim 4 wherein the integrating diffuser is partitioned into an even number of said regions with different light diffusing properties in each of said adjacent discrete regions.

6. An illuminator system as set forth in claim 4 wherein the integrating diffuser is partitioned into an odd number of said regions with different light diffusing properties in each of said adjacent discrete regions.

7. An illuminator system as set forth in claim 4 wherein a plurality of beam redirecting means comprises a plurality of prisms wherein said plurality of prisms is located after the integrating diffuser; and wherein each of said prisms is aligned to each of said adjacent discrete regions to provide control of the angular direction of light exiting each of said adjacent discrete regions.

8. An illuminator system as set forth in claim 4 wherein the integrating diffuser is partitioned into three of said regions with different light diffusing properties in each of said adjacent discrete regions.

9. An illuminator system as set forth in claim 1 wherein said illumination control means comprises an illuminating diffuser near the film gate to redirect the light beam's angular distribution so that the light is spread out in a controlled fashion, thereby providing illumination appropriate for scratch suppression.

10. An illuminator system as set forth in claim 9 wherein the illuminating diffuser is constructed to spread incoming light out to approximately ±50° in planes perpendicular to the optical axis.

11. An illuminator system as set forth in claim 9 wherein the illuminating diffuser is a circular diffuser which provides approximately ±30° of diffusion in planes perpendicular to the optical axis.

12. An illuminator system as set forth in claim 9 wherein the illuminating diffuser is adapted to provide an elliptical diffusion response.

13. An illuminator system as set forth in claim 1 wherein;
(i) said optical means comprises a spherical condensing lens adapted to alter the light beam so as to be converging and a cylindrical condensing lens adapted to focus the beam into said linear beam configuration at the film gate; and
(ii) said illumination control means comprises an integrating diffuser located in proximity to said optical means, for transforming the light beam so that said linear beam configuration at the film gate will have a substantially uniform light profile; and
an illuminating diffuser located near the film gate for redirecting the light beam's angular distribution so that the light at the film gate is spread out in a controlled fashion.

14. An illuminator system as set forth in claim 13 wherein the illuminating diffuser is located between the integrating diffuser and the film gate.

15. An illuminator system as set forth in claim 13 wherein the integrating diffuser is partitioned into said plural adjacent discrete regions with different light diffusing properties in each of said adjacent discrete regions.

16. An illuminator system as set forth in claim 4 wherein the integrating diffuser means transforms the light beam so that the linear beam configuration at the film gate will have a substantially uniform irradiance profile.

17. An illuminator system as set forth in claim 13 wherein the integrating diffuser is partitioned into an odd number of said regions with different light diffusing properties.

18. An illuminator system as set forth in claim 13 wherein the integrating diffuser is partitioned into an even number of said regions with different light diffusing properties in the different regions.

19. An illuminator system as set forth in claim 13 wherein said integrating diffuser is partitioned into three of said regions with different light diffusing properties in the different regions.

20. An illuminator system as set forth in claim 13 wherein the illuminating diffuser spreads the light beam out to approximately ±50° in planes perpendicular to the optical axis.

21. An illuminator system as set forth in claim 13 wherein the illuminating diffuser is a circular diffuser which provides approximately ±30° diffusion in planes perpendicular to the optical axis.

22. An illuminator system as set forth in claim 13 wherein the illuminating diffuser is constructed to provide an elliptical diffusion response.

23. An illuminator system as set forth in claim 13 wherein the illuminating diffuser is a holographic light shaping optical diffuser.

24. An illuminator system as set forth in claim 13 wherein the integrating diffuser is a holographic light shaping optical diffuser.

25. An illuminator system as set forth in claim 1 wherein;
(i) said optical means comprises a spherical condensing lens adapted to alter the light beam so as to be converging and a cylindrical condensing lens adapted to focus the beam to a line of light at the film gate; and
(ii) said illumination control means comprise an integrating diffuser, located in proximity to said optical means, for transforming the light beam so that said linear beam configuration at the film gate will have a substantially uniform light profile, and
an illuminating diffuser located near the film gate for redirecting the light beam's angular distribution so that the light beam at the film gate is spread out in a controlled fashion; and
a desensitizer diffuser located along said optical axis before said optical means for homogenizing the spatial details within the light beam.

26. An illuminator system as set forth in claim 1 wherein:
the said illumination control means comprises an integrating diffuser with a plurality of lobe profiles;
(i) to transform the light beam so that the linear beam configuration at the film gate will have a substantially uniform intensity profile; and
(ii) to transform the light beam to form secondary angularly narrow lobes for feedback detection.

27. An illumination system as set forth in claim 1 wherein said illumination control means produces an irradiance distribution that is uniform across the film scan region.

28. An illumination system as set forth in claim 27 wherein said illumination control means produces diffuse illumination with a predetermined angular light profile which is uniform across said film scan region.

29. An illumination system as set forth in claim 13 wherein said light source means is selected from a group comprised of a xenon arc lamp, a tungsten halogen lamp, or a metal halide arc lamp.

30. An illuminator system as set forth in claim 4 wherein said integrating diffuser is an elliptical diffuser.

31. An illuminator system as set forth in claim 9 wherein the illuminating diffuser is partitioned into said plurality of regions with different light diffusing properties in the different regions.

32. An illumination system as set forth in claim 1 wherein;
(i) said optical means comprises a spherical condensing lens adapted to alter the light beam so as to be converging; and a cylindrical condensing lens adapted to focus the beam into said linear beam configuration at the film gate; and
(ii) said illumination control means, located in proximity to said optical means, comprises an integrating diffuser with said plurality of discrete regions respectively having different light diffusing properties from each other along said first axis that is perpendicular to the optical axis and parallel to said linear beam configuration at the film gate, said regions being adjacent to each other.

33. An illumination system as set forth in claim 1 wherein said illumination control means comprises an integrating diffuser means with said plurality of discrete regions respectively having different light diffusing properties along said first axis that is perpendicular to the optical axis and parallel to said linear beam configuration at the film gate, said regions being adjacent to each other;
wherein said integrating diffuser is tilted along an axis perpendicular to the first axis and the optical axis;
whereby said integrating diffuser transforms the light beam to be diffused in a controlled manner to provide a predeterminedly controlled irradiance profile within a curvilinear area of a plane perpendicular to the optical axis.

34. A diffuser for homogenizing an incident light beam, said diffuser comprising:
a plurality of adjacent discrete regions, each of said plurality of adjacent discrete regions having different light diffusing properties for cooperatively redistributing the light beam so that light profile in a target plane after the diffuser has a predetermined radiance profile;
wherein said plurality of regions having different light diffusing properties are located along a first axis which is perpendicular to an optical axis and produce differences in an angular direction and an angular width of light diffused thereby within a plane defined by the optical axis and the first axis; and said diffuser comprises further regions which have the same light diffusing properties, said further regions being located along a second axis that is both perpendicular to the optical axis and perpendicular to the first axis.

* * * * *